Dec. 11, 1923.  1,476,947
A. J. BROWN
WINDING SECURING MEANS FOR DYNAMO ELECTRIC MACHINES
Filed July 18, 1921
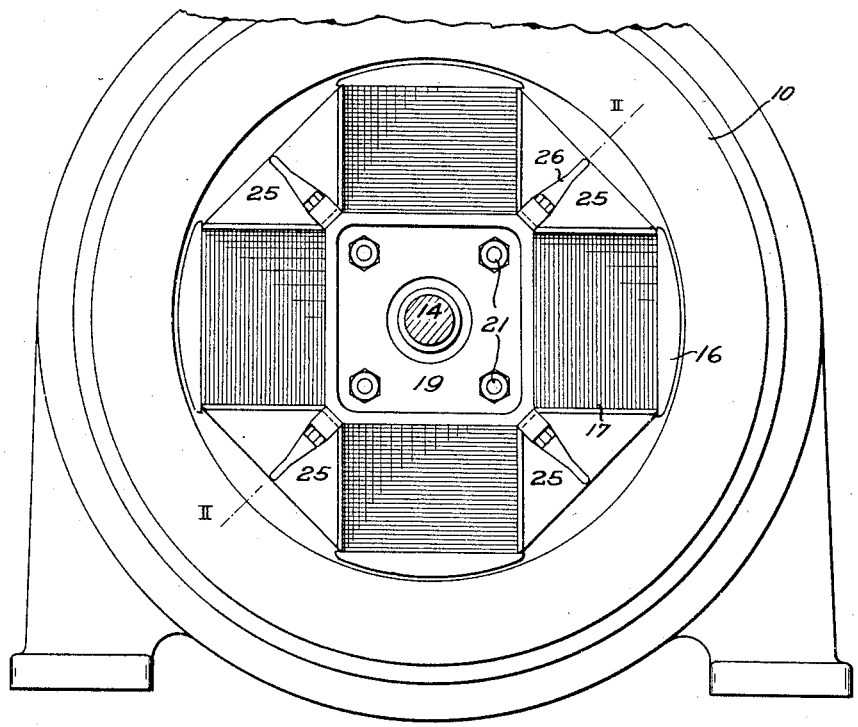
Fig. 1
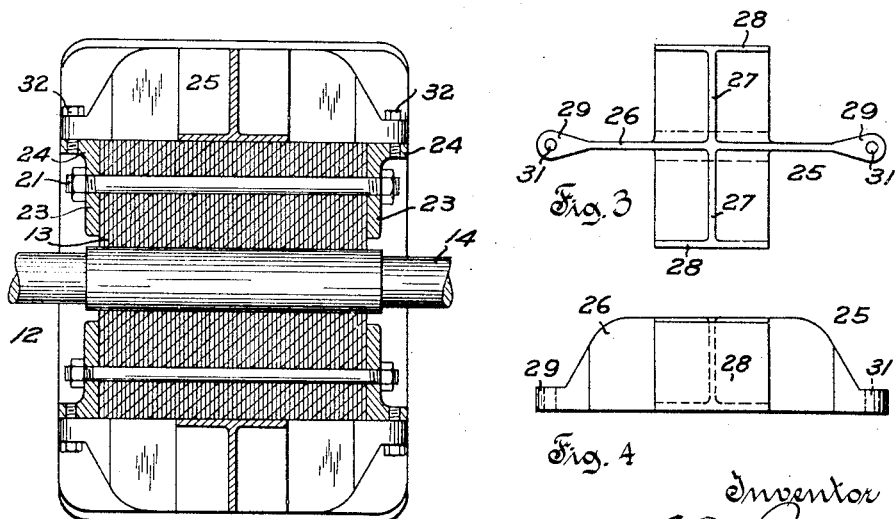
Fig. 2
Fig. 3
Fig. 4
Inventor
A. J. Brown
by
Attorney Patented Dec. 11, 1923.

1,476,947

UNITED STATES PATENT OFFICE.

ARTHUR J. BROWN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

WINDING-SECURING MEANS FOR DYNAMO-ELECTRIC MACHINES.

Application filed July 18, 1921. Serial No. 485,651.

*To all whom it may concern:*

Be it known that ARTHUR J. BROWN, a citizen of the United States, residing at Milwaukee, in the county of Milwaukee and State of Wisconsin, has invented a certain new and useful Improvement in Winding-Securing Means for Dynamo-Electric Machines, of which the following is a specification.

This invention relates in general to dynamo-electric machines, and has particular relation to machines of the rotating field type, such as alternating current synchronous machines, designed for operation at relatively high rotative speeds.

In certain types of dynamo-electric machines, particularly in rotating field members of high-speed machines, the windings are under great stresses tending to distort or displace these elements. These stresses are particularly noticeable in the rotating fields of synchronous, alternating current machines wherein, in accordance with one ordinary construction, the field winding is in the form of a concentrated winding coil surrounding each of the individual field poles. In machines designed for high-speed operation, wherein there are usually a relatively small number of field poles, the centrifugal force acting on the field windings and tending to shift the side portions of the windings away from the poles is very large.

In general accordance with the purpose of this invention, means are provided for effectively supporting and securing the windings, especially of rotating members of dynamo-electric machines, in position against any tendency toward displacement or distortion due to stresses or strains arising during the operation of the machine; and the provision of securing means is so related to ordinarily inherent elements of structure of the machine as to provide an exceedingly simple and efficient construction of dynamo-electric machine.

It is an object of this invention to provide an improved design and construction of dynamo-electric machine, involving improved means for bracing, clamping or securing windings of the machine in operative position against any tendency toward displacement or distortion.

This and other objects and advantages are secured by this invention, the various novel features of which are disclosed in the description and drawing, showing one form of the invention, and are intended to be particularly pointed out in the claims.

In the accompanying drawings:

Fig. 1 is an end elevation of a dynamo-electric machine of the rotating field type, embodying features of this invention.

Fig. 2 is a radial section along the plane of the line II—II of Fig. 1.

Fig. 3 is a plan view of the clamping or bracing member provided on the machine shown in Figs. 1 and 2.

Fig. 4 is a side elevation of the clamping member disclosed in Fig. 3.

In the apparatus disclosed in the drawings, a dynamo-electric machine has a stator element 10, which may be considered as the stationary armature of a synchronous alternating current generator, and a rotating field element 12, the latter comprising a core 13 of generally square shape in radial cross-section and integral with or, as shown herein, made up of laminations and secured in operative position on a shaft 14, and a plurality of field magnets of the projecting pole type, here shown as four in number, each comprising a pole piece 16 and a concentrated winding 17 surrounding the pole piece, the windings being often assembled on spools or forms.

As shown, the laminations of the core 13 of the rotating field element are held in operative position on the shaft 14 by being clamped between rotor end plates 19, as by means of bolts 21 passing through apertures in the laminations and the end plates, and adjustable nuts on the ends of the bolts. Each of these end plates comprises, in addition to its radially extending body portion 23 which bears against the body portion of the core, an axially extending flange portion 24 at the radially outer periphery of the plate. As indicated in the drawings, the outer periphery of the flanges is adjacent the radially inner ends of the pole pieces 16 and the outer surface of the flanges is thus in a position to form a seat or bearing for the inner ends field windings 17, or the spools upon which the windings are assembled.

Bracing or clamping members 25 are disposed between the windings upon adjacent pole pieces, these bracing members serving to hold the windings in normal position against any tendency toward distortion or displacement. Each of these members 25 includes a central web portion 26 extending in a general radial plane when the members are in operative position, and one or more transverse webs 27 extending from the longitudinal web, and plate or flange portions 28 uniting the outer edges of the webs 27 and the base or root of the central longitudinal web 26, these plate or flange portions being at such an angle to each other that when the bracing members are in operative position, the portions 28 may bear against the sides of the windings upon adjacent field poles. The ends of the central web 26 are extended beyond the normal flux-carrying portion of the core and are enlarged and apertured, as indicated at 29.

When the clamping or bracing members are in operative position on the rotary field element, the apertures of the end portions 29 are radially alined with corresponding apertures 31 in the flanges 24 of the end plates 19, and the clamping or bracing members are held in operative position as by means of cap screws 32, or bolts provided with lock nuts, passing through the alined apertures in the end portions 29 of the bracing members and the flanges 24 of the end plates.

With the construction described above, it will be apparent that the bracing or clamping members 25 may be drawn to and supported and secured in operative position so as to lie firmly against the sides of the field windings 17 of the rotating field member, and that the desirable results are secured in a simple and efficient manner through utilization of the end clamping plates of the core body which have the additional function of constituting a seat or bearing for the radially inner ends of the several field windings.

It should be understood that it is not desired that the invention claimed be limited to the exact details of construction shown and described herein, for obvious modifications will readily occur to one skilled in the art.

It is claimed and desired to secure by Letters Patent:

1. In a dynamo-electric machine, a core element having polar projections, windings disposed on the polar projections of said core element, a bracing device located between and holding windings on adjacent polar projections in desired position, and means for holding said bracing device in operative position comprising portions associated with said bracing device and extending beyond the ends of the body portion of said core, a member carried by said core and constituting a support for end portions of said windings, and means for securing the extending portions associated with said bracing device to said member.

2. In a dynamo-electric machine, a core element having polar projections, windings disposed on the polar projections of said core element, a bracing device located between and holding windings on adjacent polar projections in desired position, and means for holding said bracing device in operative position comprising portions associated with said bracing device and extending beyond the ends of the body portion of said core, members carried by said core and having axial extensions constituting supports for end portions of said windings, and means for securing the extending portions associated with said bracing device to the axial extensions of said members.

3. In a dynamo-electric machine, a laminated core element having projecting pole pieces and coils disposed thereon, a clamping and bracing device located between and holding adjacent coils in assembled condition, end plates on said core having axially extending flanges, means associated with said end plates for holding said laminations clamped in assembled condition between said end plates, and means for securing said clamping device to the axially extending flanges of said end plates.

4. In a dynamo-electric machine, a laminated core mounted on a shaft, end plates and means associated therewith for clamping and holding laminations of said core in assembled condition between said end plates, a plurality of projecting pole pieces associated with said core, coils mounted on said pole pieces, said end plates having portions constituting supports for end portions of said coils clamping and bracing devices located between and serving to hold adjacent coils in operative position, said clamping devices comprising portions extending axially beyond said core, and securing devices for attaching the extending end portions of said clamping devices to said end plates.

5. In a dynamo-electric machine, a laminated core mounted on a shaft, end plates and means co-operative therewith for clamping and holding laminations of said core in assembled condition between said end plates, each of said end plates having an axially extending flange at its outer periphery, a plurality of projecting pole pieces associated with said core, coils mounted on said pole pieces, the radially inner sides of said coils at end portions thereof being adapted to bear against said axial flanges, clamping and bracing devices located between and serving to hold adjacent coils in operative position, and means for securing said clamping devices to said end plates.

6. In a dynamo-electric machine, a laminated core assembled on a shaft, end plates and means co-operative therewith for clamping and holding the laminations of said core in assembled condition between said end plates, each of said end plates having an axially extending flange at its outer periphery, a plurality of projecting pole pieces associated with said core, coils mounted on said pole pieces, the radially inner sides of said coils bearing against said axial flanges, clamping and bracing devices located between and holding adjacent coils in operative position, each of said clamping and bracing devices comprising portions extending axially beyond the ends of the core, and means for securing the extending end portions of said devices to the axial flanges of said end plates.

In testimony whereof, the signature of the inventor is affixed hereto.

ARTHUR J. BROWN.